(12) United States Patent
Huang et al.

(10) Patent No.: US 11,268,845 B2
(45) Date of Patent: Mar. 8, 2022

(54) LIQUID LEVEL MONITORING SYSTEM AND METHOD

(71) Applicant: NATIONAL APPLIED RESEARCH LABORATORIES, Taipei (TW)

(72) Inventors: Chun-Ming Huang, Hsinchu (TW); Chen-Chia Chen, Hsinchu (TW); Chih-Hsing Lin, Hsinchu (TW); Chien-Ming Wu, Hsinchu (TW)

(73) Assignee: National Applied Research Laboratories, Taipei (TW)

( * ) Notice: Subject to any disclaimer, the term of this patent is extended or adjusted under 35 U.S.C. 154(b) by 42 days.

(21) Appl. No.: 16/885,804

(22) Filed: May 28, 2020

(65) Prior Publication Data

US 2021/0063229 A1 Mar. 4, 2021

Related U.S. Application Data

(60) Provisional application No. 62/893,965, filed on Aug. 30, 2019.

(51) Int. Cl.
*G01F 23/296* (2006.01)
*G01F 23/2965* (2022.01)

(52) U.S. Cl.
CPC ...... *G01F 23/2965* (2013.01); *G01F 23/2961* (2013.01)

(58) Field of Classification Search
CPC ............. G01F 23/2961; G01F 23/2965; G01F 23/2966
See application file for complete search history.

(56) References Cited

U.S. PATENT DOCUMENTS

| | | | | |
|---|---|---|---|---|
| 3,079,596 A | * | 2/1963 | Atkinson | G01F 23/2965 340/621 |
| 5,027,655 A | * | 7/1991 | Sweet | G01F 23/28 73/290 V |
| 5,319,973 A | * | 6/1994 | Crayton | G01F 23/2962 181/124 |
| 5,408,874 A | * | 4/1995 | Fleck, Sr. | G01F 23/2962 367/908 |
| 6,229,476 B1 | * | 5/2001 | Lutke | G01F 23/284 324/332 |

(Continued)

FOREIGN PATENT DOCUMENTS

CN 1587924 A * 3/2005
CN 101852639 A * 10/2010
(Continued)

*Primary Examiner* — John Fitzgerald
(74) *Attorney, Agent, or Firm* — Rosenberg, Klein & Lee (57) ABSTRACT

A liquid level monitoring system includes: a hardware unit with a tube to extend through a surface of a liquid; a processor unit generating control signals that respectively correspond to target frequencies; a sound generator unit generating, respectively based on the control signals, incident sound waves that transmit in the tube and that are reflected by the surface of the liquid to respectively form reflected sound waves; and a sensor unit for sensing the reflected sound waves to respectively generate feedback signals. The processor unit determines a maximum amplitude frequency based on the feedback signals, and calculates a level of the surface of the liquid based on the maximum amplitude frequency and a length of the tube.

11 Claims, 10 Drawing Sheets

(56) References Cited

U.S. PATENT DOCUMENTS

| | | | |
|---|---|---|---|
| 7,062,967 B2 * | 6/2006 | Hale .................... | B60K 15/00 |
| | | | 73/290 V |
| 7,421,895 B1 * | 9/2008 | Caldwell ............ | G01F 23/2962 |
| | | | 73/290 V |
| 9,109,997 B2 * | 8/2015 | Urban ................ | G01F 23/2965 |
| 10,634,545 B2 * | 4/2020 | Bostrom ............ | G01F 25/0061 |
| 10,656,003 B2 * | 5/2020 | Kojima ............... | G01F 23/2966 |
| 2012/0119758 A1 * | 5/2012 | Urban ................ | G01F 23/2967 |
| | | | 324/617 |
| 2012/0174671 A1 * | 7/2012 | Urban ................ | G01F 25/0061 |
| | | | 73/579 |
| 2013/0294199 A1 * | 11/2013 | Polishuk ................ | G01F 23/28 |
| | | | 367/118 |
| 2014/0060177 A1 * | 3/2014 | Kline ................ | G01F 23/2962 |
| | | | 73/290 V |
| 2016/0258803 A1 * | 9/2016 | Motomiya .......... | G01F 23/2967 |
| 2019/0162577 A1 * | 5/2019 | Kojima ............... | G01F 23/2968 |

FOREIGN PATENT DOCUMENTS

| | | | | |
|---|---|---|---|---|
| CN | 203100824 U | * | 7/2013 | |
| CN | 107764369 B | * | 11/2019 | |
| DE | 102011119664 A1 | * | 5/2013 | ............. G01F 23/76 |
| DE | 202016006955 U1 | * | 1/2017 | ........... G01F 23/296 |
| JP | 09203652 A | * | 8/1997 | |
| RU | 2213940 C1 | * | 10/2003 | |

* cited by examiner

LIQUID LEVEL MONITORING SYSTEM AND METHOD

CROSS-REFERENCE TO RELATED APPLICATION

This application claims priority of U.S. Provisional Patent Application No. 62/893,965, filed on Aug. 30, 2019.

FIELD

The disclosure relates to a liquid level monitoring system and a liquid level monitoring method, and more particularly to a liquid level monitoring system and a liquid level monitoring method that utilize sound waves.

BACKGROUND

Liquid level monitoring systems are used to measure a level of a surface of a liquid (hereinafter referred to as the liquid level), and are mainly divided into two types: contact type and non-contact type. The conventional contact type liquid level monitoring systems calculate the liquid level based on pressure or buoyancy of the liquid. The non-contact liquid level monitoring systems calculate the liquid level based on time of flight of an ultrasonic or radar wave. The conventional liquid level monitoring systems have the following disadvantages.

1. Construction costs are high. The construction cost of a single conventional contact type liquid level monitoring system is about 10K to 30K New Taiwan Dollars (NTDs). The construction cost of a single conventional non-contact type liquid level monitoring system is about 30K to 300K NTDs. Therefore, the cost for monitoring the liquid level over a large area is quite high as multiple systems will be required.

2. The resolutions are low. The resolution of a conventional contact type liquid level monitoring system is about 5 mm to 10 mm. The resolution of a conventional non-contact type liquid level monitoring system is about 2 mm (using the radar wave) to 10 mm (using the ultrasonic wave). Therefore, the conventional level monitoring systems is unsuitable for high precision liquid level detection.

3. The resolutions are fixed, and cannot be adjusted according to application requirements.

In addition, components of the conventional non-contact type liquid level monitoring systems must have high precision since the time of flight is very short, and thus are difficult to be repaired. Therefore, the conventional non-contact type liquid level monitoring systems have high repair costs.

SUMMARY

Therefore, an object of the disclosure is to provide a liquid level monitoring system having a low construction cost and a liquid level monitoring method thereof.

According to an aspect of the disclosure, the liquid level monitoring system is for detecting a level of a surface of a liquid, and includes a hardware unit, a processor unit, a sound generator unit and a sensor unit. The hardware unit includes a tube that is to extend through the surface of the liquid, and that defines a channel. The processor unit is disposed in the hardware unit, and generates a plurality of control signals that respectively correspond to a plurality of target frequencies in a target frequency range. The sound generator unit is mounted to the hardware unit, is to receive the control signals from the processor unit, and generates, based on the control signals, a plurality of incident sound waves that respectively have the target frequencies. The incident sound waves transmit in the channel, and are reflected at a height level of the surface of the liquid to respectively form a plurality of reflected sound waves. The sensor unit is mounted to the hardware unit, and is to sense the reflected sound waves to respectively generate a plurality of feedback signals. The processor unit is to receive the feedback signals from the sensor unit, determines, based on the feedback signals, a maximum amplitude frequency that is a frequency of one of the reflected sound waves which has a greatest amplitude among all of the reflected sound waves, and calculates the level of the surface of the liquid based on at least the maximum amplitude frequency and a length of the tube.

According to another aspect of the disclosure, the liquid level monitoring method is to be implemented by a processor unit, and is for detecting a level of a surface of a liquid in a tube. The processor unit is operatively associated with a sound generator unit and a sensor unit. The sound generator unit generates a plurality of incident sound waves based on a plurality of control signals provided by the processor unit. The incident sound waves transmit in a channel defined by the tube, and are reflected at a height level of the surface of the liquid to respectively form a plurality of reflected sound waves. The sensor unit senses the reflected sound waves to respectively generate a plurality of feedback signals for receipt by the processor unit. The liquid level monitoring method includes: (A) generating the control signals that respectively correspond to a plurality of target frequencies in a target frequency range, so as to make the incident sound waves respectively have the target frequencies; (B) determining, based on the feedback signals, a maximum amplitude frequency that is a frequency of one of the reflected sound waves which has a greatest amplitude among all of the reflected sound waves; and (C) calculating the level of the surface of the liquid based on at least the maximum amplitude frequency and a length of the tube.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Referring to FIGS. 1 to 4, an embodiment of a liquid level monitoring system according to the disclosure is for detecting a level of a surface 51 of a liquid 5 (hereinafter referred to as the liquid level), and includes a hardware unit 1, a processor unit 2, a sound generator unit 3 and a sensor unit 4.

The hardware unit 1 includes a tube 11 that is to vertically extend through the surface 51 of the liquid 5 to be partially disposed in the liquid 5, a sound reflector 12 that is disposed in the tube 11, a container 13 that is disposed at an end of the tube 11 which is above the surface 51 of the liquid 5, a connecting module 14 that is for connecting the container 13 and the tube 11, a liquid inlet component 15 that is disposed at another end of the tube 11 which is distal from the container 13 and which is below the surface 51 of the liquid 5 and disposed in the liquid 5, a securing module 16 for securing the tube 11, and a washer 17 that is disposed between the container 13 and the connecting module 14.

Figure 3:
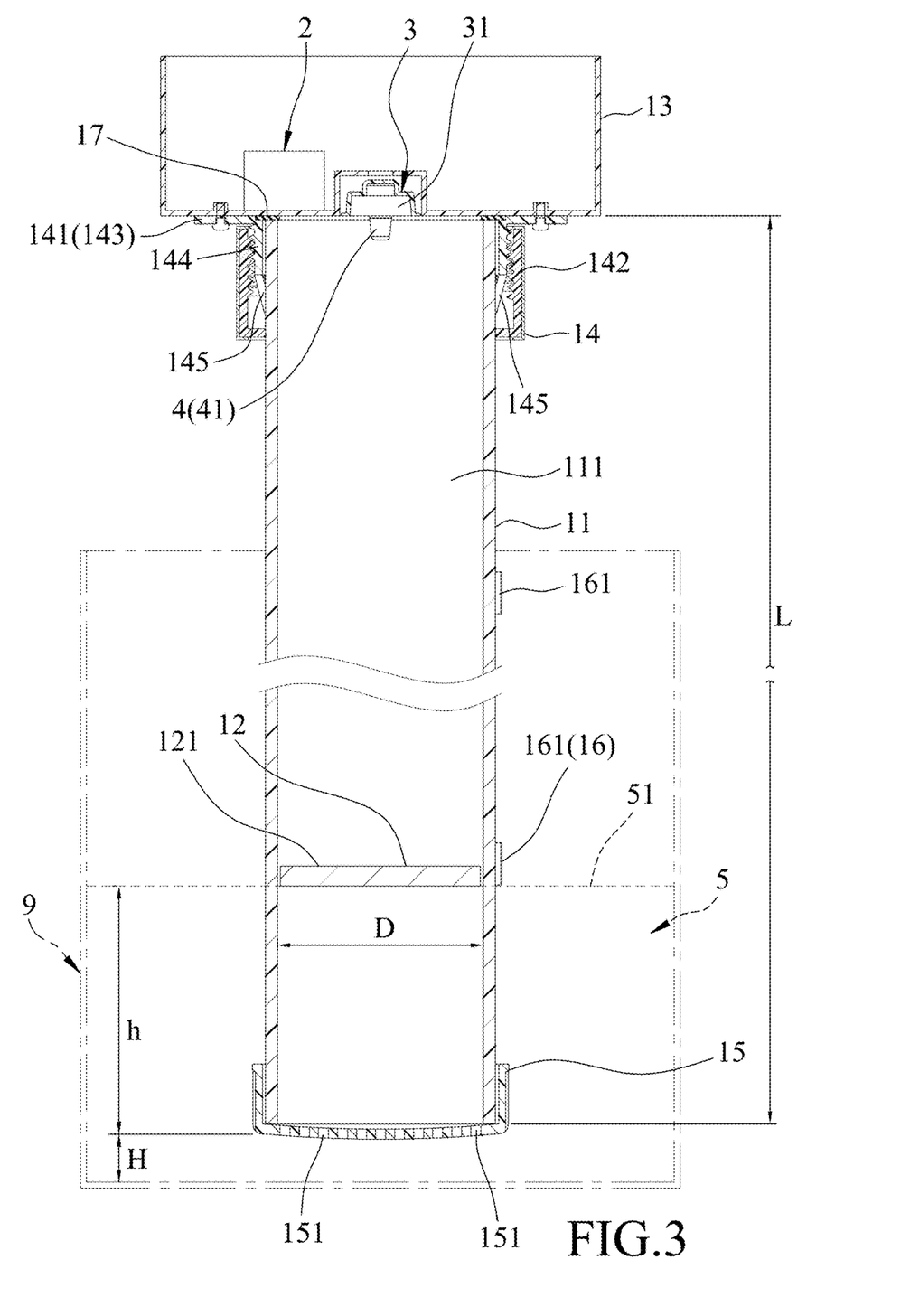
FIG. 3 is a sectional side view of the embodiment taken along line III-III in FIG. 1.

The tube 11 defines a channel 111, and has a length of "L". In this embodiment, the liquid 5 is in a tank 9 as shown in FIG. 3. The liquid inlet component 15 may contact a bottom of the tank 9 (i.e., a distance of "H" between the liquid inlet component 15 and the bottom of the tank 9 is zero), so the liquid level is equal to "h" that is a sum of a length of a portion of the tube 11 in the liquid 5 and a thickness of a bottom portion of the liquid inlet component 15. Alternatively, the liquid inlet component 15 may be spaced apart from the bottom of the tank 9 (i.e., H≠0), so the liquid level is equal to a sum of h and H. The liquid level monitoring system of this embodiment will be described in detail below in a scenario where H=0. In other embodiments, the liquid level monitoring system may be applied in a sewer or a pool.

The sound reflector 12 has a surface 121 that faces the container 13. The sound reflector 12 is capable of floating on the surface 51 of the liquid 5. The surface 121 is made of a material that can reflect sound waves with low energy loss. It should be noted that a thickness of the sound reflector 12 is exaggerated in the drawings. In practice, the sound reflector 12 is sufficiently thin such that the thickness thereof can be disregarded in the detection of the liquid level.

Figure 2:
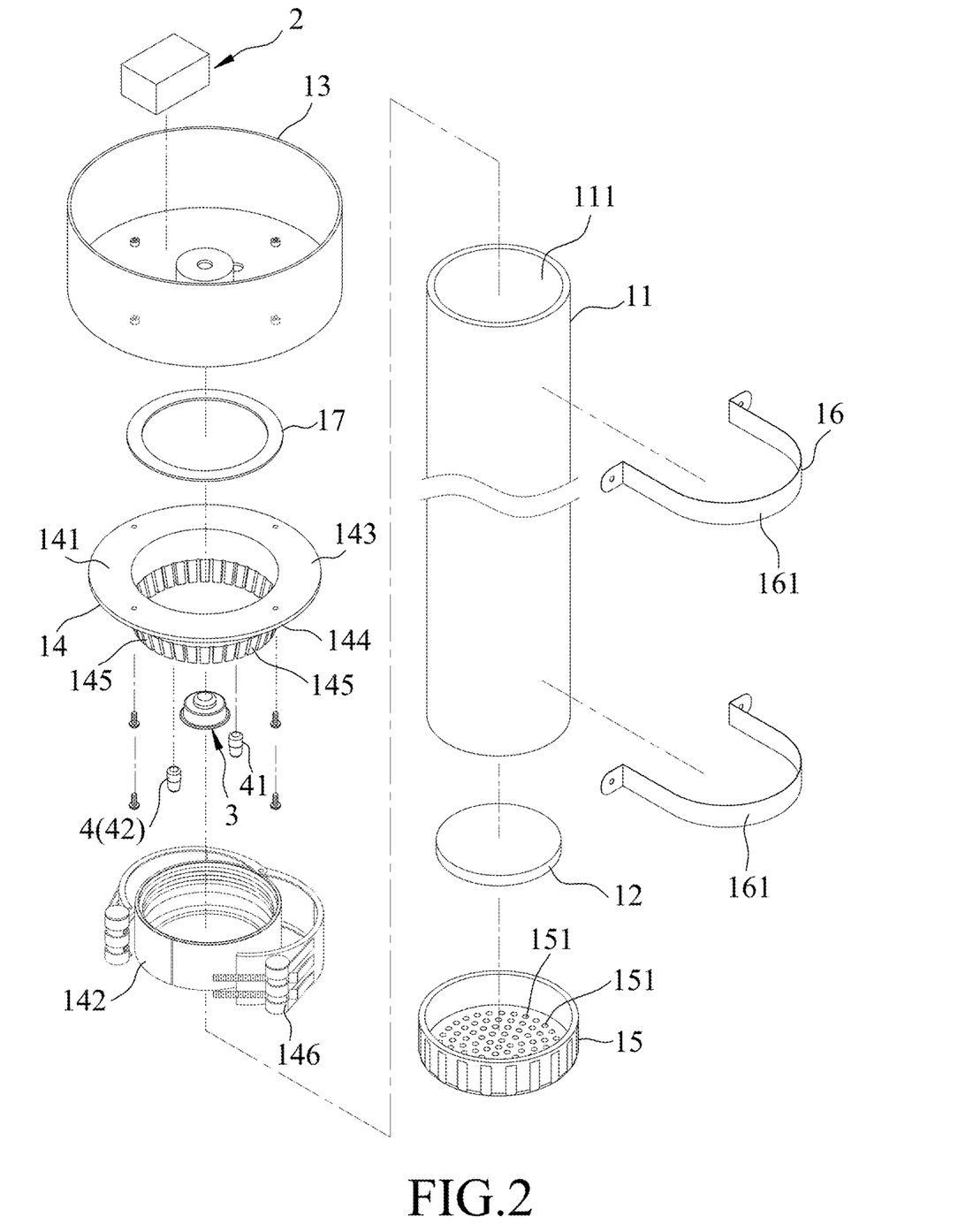
FIG. 2 is an exploded perspective view of the embodiment.

The connecting module 14 includes a connector 141 and a ferrule 142. The connector 141 surrounds the tube 11, and is detachably fastened to the container 13. The ferrule 142 surrounds the connector 141, and pinches the connector 141 so as to hold the connector 141 and the tube 11 together.

The connector 141 has a connecting portion 143, a threading portion 144 and a clamping portion 145. The connecting portion 143 is detachably fastened to a bottom of the container 13. The threading portion 144 extends downward from the connecting portion 143, and is formed with threads on its outer surface. The clamping portion 145 extends downward from the threading portion 144, and can be tightened around the tube 11.

The ferrule 142 is formed with threads on its inner surface so as to be screwed together with the threading portion 144 of the connector 141. The ferrule 142 is implemented as a clamp ferrule in this embodiment to pinch the threading portion 144 of the connector 141 such that the clamping portion 145 of the connector 141 is tightened around the tube 11, and can work with tubes of different diameters. Specifically speaking, the ferrule 142 has an outer fastening portion 146. By extending screws (not labeled) into the fastening portion 146 of the ferrule 142 so as to threadedly engage the same, the clamping portion 145 of the connector 141 can be tightened around the tube 11 regardless of the diameter of the tube 11.

The liquid inlet component 15 is formed with a plurality of through holes 151 to establish fluid communication between the tube 11 and the tank 9, so the liquid level is the same inside and outside the tube 11.

Figure 1:
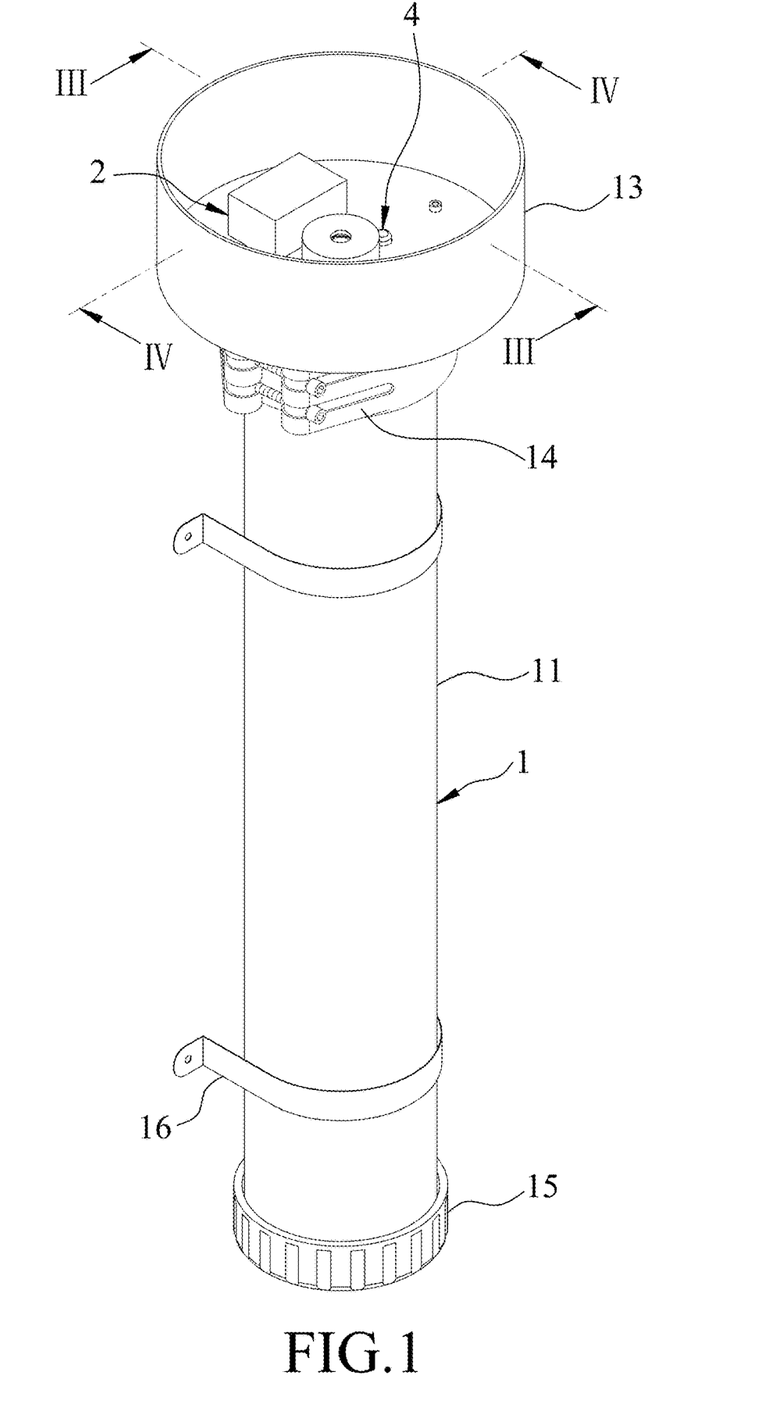
FIG. 1 is a perspective view of an embodiment of a liquid level monitoring system according to the disclosure.

The securing module 16 includes two securing elements 161 that are separately disposed along the tube 11. The securing elements 161 are secured to the tank 9 by screws (not shown).

The washer 17 is sandwiched among the connecting portion 143 of the connector 141, an end surface of the tube 11 which is at the end of the tube 11 that is above the surface 51 of the liquid 5, and an outer surface of the container 13.

Figure 4:
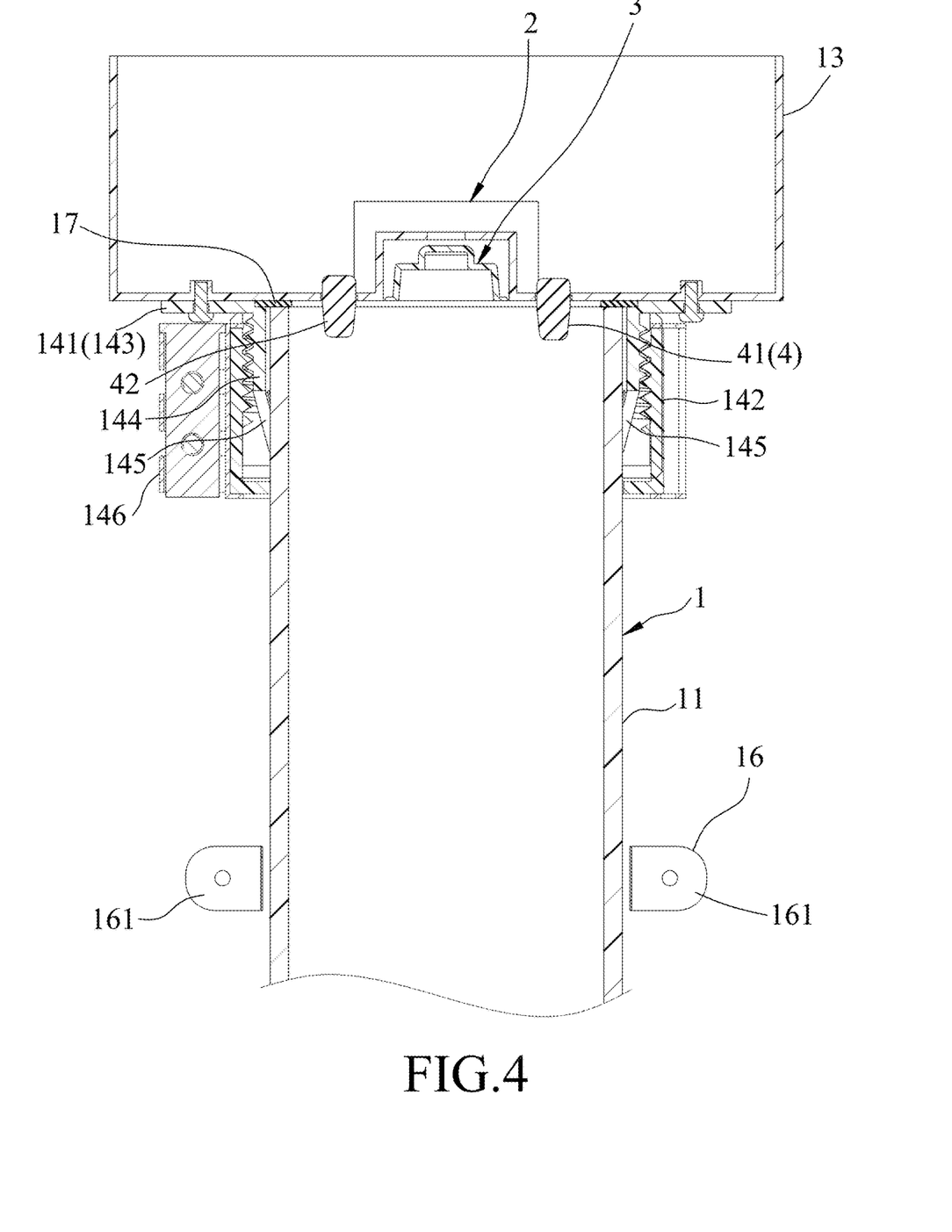
FIG. 4 is a sectional side view of the embodiment taken along line IV-IV in FIG. 1.
Figure 5:
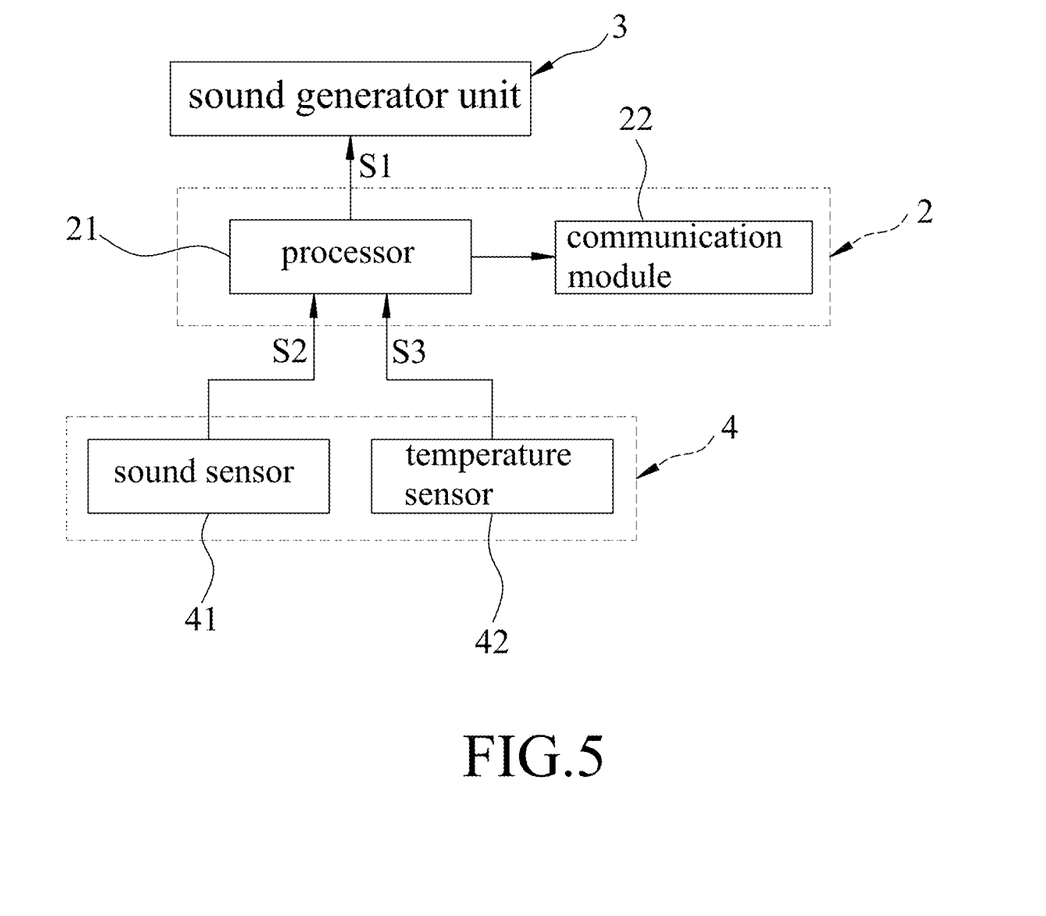
FIG. 5 is a block diagram illustrating the embodiment.

Referring to FIGS. 3 to 5, the processor unit 2 is disposed in the container 13 of the hardware unit 1, and includes a processor 21, and a communication module 22 that is coupled to the processor 21.

The processor 21 generates a plurality of control signals (S1) that respectively correspond to a plurality of target frequencies in a target frequency range.

The communication module 22 is capable of communicating with a remote control center (not shown) in a wireless manner (e.g., using Bluetooth, Wi-Fi or the like).

The sound generator unit 3 is mounted to the container 13 of the hardware unit 1, is coupled to the processor 21 for receiving the control signals (S1) therefrom, and generates, based on the control signals (S1), a plurality of incident sound waves that respectively have the target frequencies. In this embodiment, the sound generator unit 3 includes a loudspeaker 31 and a signal generator (not shown). The loudspeaker 31 has a resistance of 4Ω and an output power of 3 W. The signal generator (e.g., a direct digital synthesizer having a model name of AD9838) is coupled to the processor 21 for receiving the control signals (S1) therefrom, is further coupled to the loudspeaker 31, and drives, based on the control signals (S1), the loudspeaker 31 to generate the incident sound waves.

The incident sound waves transmit in the channel 111, and are reflected by the surface 121 of the sound reflector 12, which floats on the surface 51 of the liquid 5 and is thus disposed at a height level of the surface 51, to respectively form a plurality of reflected sound waves. It should be noted that, in a first modification of this embodiment (hereinafter referred to as the first modified embodiment), the sound reflector 12 is omitted, and the incident sound waves are reflected by the surface 51 of the liquid 5 itself to respectively form the reflected sound waves.

The sensor unit 4 is mounted to the container 13 of the hardware unit 1, and includes a sound sensor 41 and a temperature sensor 42 that protrude into the tube 11. The sound sensor 41 (e.g., a microphone having a model name of ADMP401) is for sensing the reflected sound waves to generate a plurality of feedback signals (S2) that respectively correspond to the reflected sound waves (note that throughout the description, the term "reflected sound wave (s)" refers to the reflected sound wave(s) that arrives or arrive at the sound sensor 41). The temperature sensor 42 (e.g., one having a model name of LM35) is for sensing a temperature of "T" inside the tube 11 to generate a temperature indication signal (S3).

Figure 6:
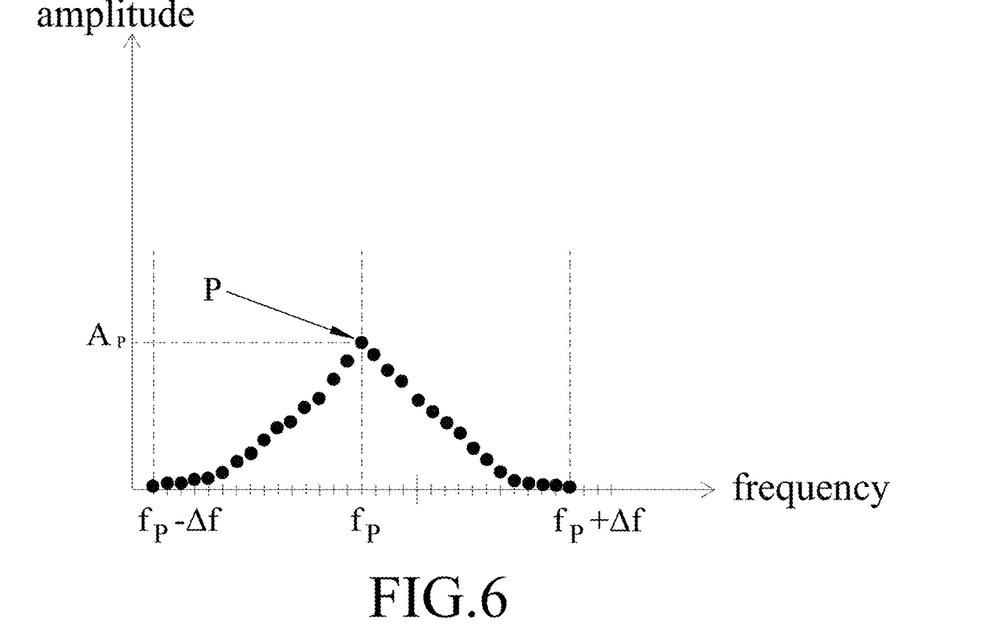
FIG. 6 is a plot illustrating amplitudes and frequencies of reflected sound waves in a first modification of the embodiment where a sound reflector is omitted.
Figure 7:
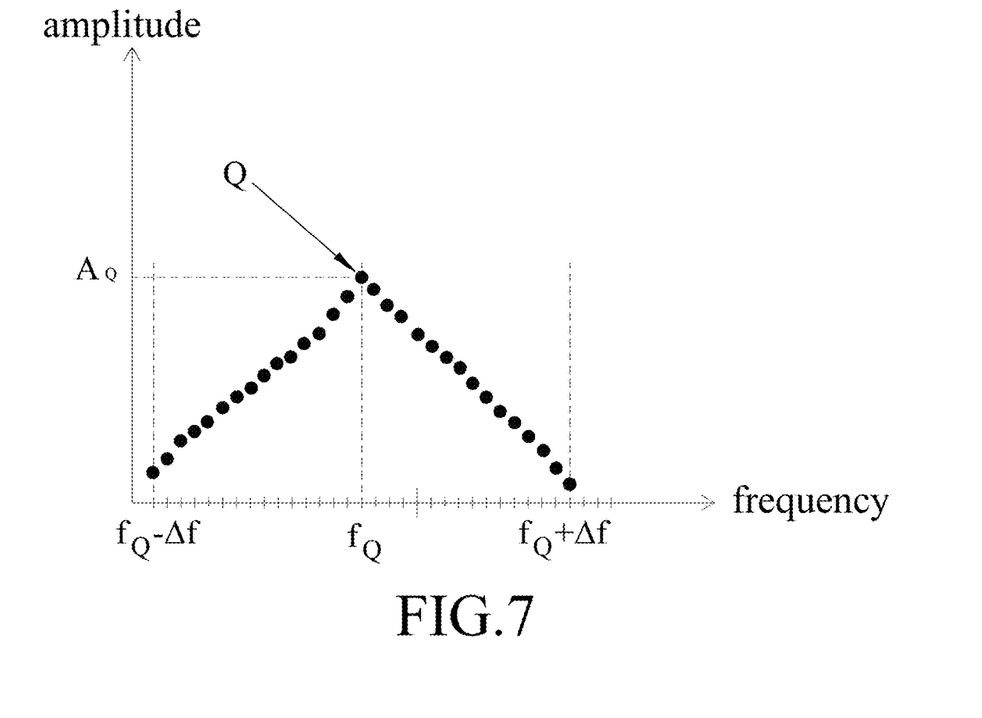
FIG. 7 is a plot illustrating amplitudes and frequencies of reflected sound waves in the embodiment.

FIG. 6 illustrates amplitudes and frequencies of reflected sound waves of the first modified embodiment where the incident sound waves are reflected by the surface 51 of the liquid 5. FIG. 7 illustrates amplitudes and frequencies of the reflected sound waves of this embodiment where the incident sound waves are reflected by the sound reflector 12 (see FIG. 3). It is known from FIGS. 6 and 7 that a maximum of the amplitudes ($A_P$) of the reflected sound waves of the first modified embodiment is smaller than a maximum of the amplitudes ($A_Q$) of the reflected sound waves of this embodiment, and that the sound reflector 12 can reduce energy loss. Therefore, this embodiment can be used in a scenario where the liquid level is low (i.e., transmission distances of the reflected sound waves are long), so that the amplitudes of the reflected sound waves are sufficiently large, and that the reflected sound waves can be well sensed by the sound sensor 41 to reduce sensing error.

Referring back to FIGS. 3 to 5, the processor unit 2 is coupled to the sound sensor 41 for receiving the feedback signals (S2) therefrom, and is coupled to the temperature sensor 42 for receiving the temperature indication signal (S3) therefrom. The processor unit obtains respective frequencies and respective amplitudes of the reflected sound waves from the feedback signals (S2), determines a maximum amplitude frequency that is the frequency of one of the reflected sound waves which has the greatest amplitude among all of the reflected sound waves, and calculates the liquid level based on the maximum amplitude frequency, a diameter of "D" of the tube 11, the length of the tube 11, and the temperature in the tube 11 as indicated by the temperature indication signal (S3). It should be noted that the processor 21 communicates with the sound generator unit 3 and the sensor unit 4 in a wired manner in this embodiment, but may communicate with these units 3, 4 in a wireless manner in other embodiments.

In this embodiment, the processor 21 obtains the liquid level (i.e., h) according to the following equation:

$$h = L + A - \frac{(n+1) \cdot v}{2 \cdot f}, \quad \text{Equation 1}$$

where "A" denotes a constant related to the diameter of the tube 11 (i.e., D), "n" denotes a resonant frequency mode number, "v" denotes a speed of sound waves in air, and is related to the temperature in the tube 11 (i.e., T), "f" denotes the maximum amplitude frequency, and a ratio of the constant to the diameter of the tube 11 (i.e., A/D) falls within a range of from 0.7 to 0.9.

Equation 1 is derived according to the principle of air column resonance, where (L−h) is a length of an air column, and "A" is a correction factor. The principle of air column resonance is well known in the art, and therefore details thereof are omitted herein for the sake of brevity.

In particular, A=0.8·D, and v=(331+0.6·T) m/s, where "T" is in degrees Celsius. Therefore, Equation 1 can be rearranged into the following equation:

$$h = L + 0.8 \cdot D - \frac{(n+1) \cdot (331 + 0.6 \cdot T)}{2 \cdot f}. \quad \text{Equation 2}$$

The processor 21 wirelessly transmits the liquid level calculated thereby to the remote control center via the communication module 22. The remote control center may store the liquid level received thereby in a database thereof, so the liquid level can be read from the database later, when necessary.

Figure 8:
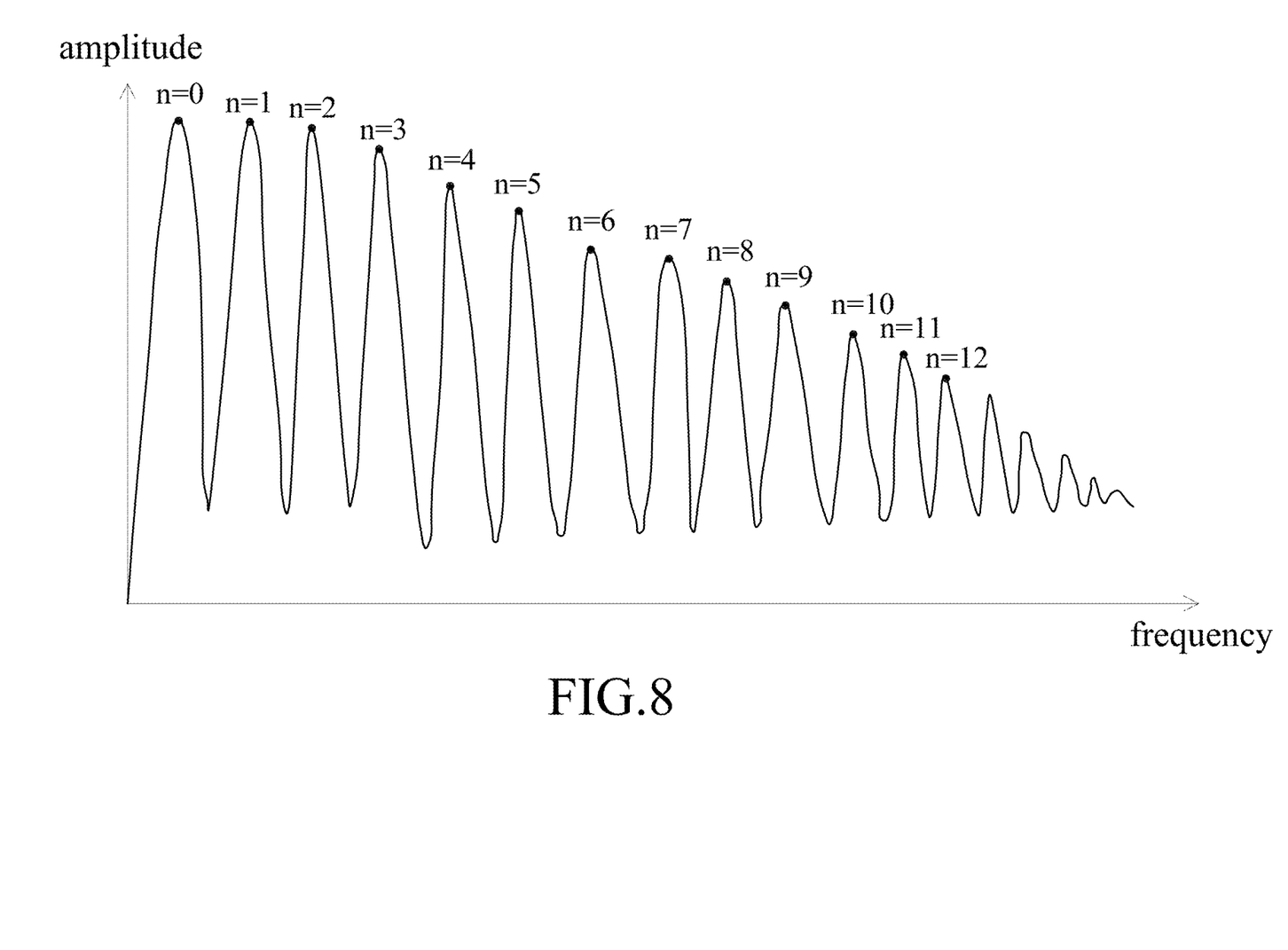
FIG. 8 is a plot illustrating a relationship between frequency and amplitude of the reflected sound waves in the embodiment under a given scenario.

FIG. 8 illustrates a relationship between the frequency and amplitude of the reflected sound wave in a scenario where the liquid level, the temperature in the tube 11 and the length of the tube 11 are fixed. Each peak corresponds to a respective resonant frequency mode number (i.e., n), so the selection of the resonant frequency mode number would determine the target frequency range to be used. In practice, a frequency range that covers the frequency corresponding to the selected resonant frequency mode number may be determined to be the target frequency range, and the maximum amplitude frequency obtained from the reflected sound waves is expected to be close to the frequency corresponding to the selected resonant frequency mode number. It is known from FIG. 8 that a greater resonant frequency mode number corresponds to a higher maximum amplitude frequency and a smaller corresponding amplitude.

Figure 9:
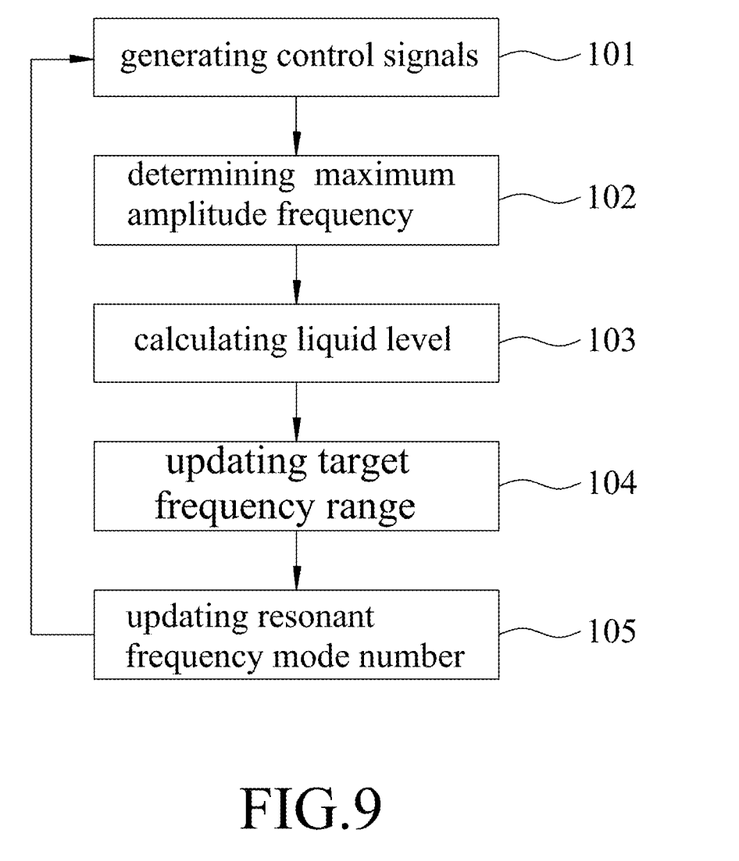
FIG. 9 is a flow chart illustrating a liquid level monitoring method performed by the embodiment.

Referring to FIGS. 3, 5 and 9, a liquid level monitoring method performed by the processor 21 includes the following steps 101-105.

In step 101, the processor 21 generates, for receipt by the sound generator unit 3, the control signals (S1) that respectively correspond to the target frequencies in the target frequency range, so as to make the incident sound waves respectively have the target frequencies. In this embodiment, the target frequency range has a lower limit of ($f_0$−Δf) Hz and an upper limit of ($f_0$+Δf) Hz; the target frequencies are evenly spaced over the target frequency range (e.g., the target frequencies are respectively ($f_0$−Δf) Hz, ($f_0$−Δf+1) Hz, ($f_0$−Δf+2) Hz, . . . , and ($f_0$+Δf) Hz); and the incident sound waves with a frequency increment of 1 Hz are sequentially generated at a rate of one per second.

In step 102, the processor 21 receives the feedback signals (S2) from the sound sensor 41 and the temperature indication signal (S3) from the temperature sensor 42, and determines the maximum amplitude frequency based on the feedback signals (S2).

In step 103, the processor 21 calculates the liquid level based on the maximum amplitude frequency, the diameter of the tube 11, the length of the tube 11, the temperature in the tube 11 as indicated by the temperature indication signal (S3), and Equation 2. The processor 21 further wirelessly transmits the liquid level calculated thereby to the remote control center via the communication module 22.

Figure 10:
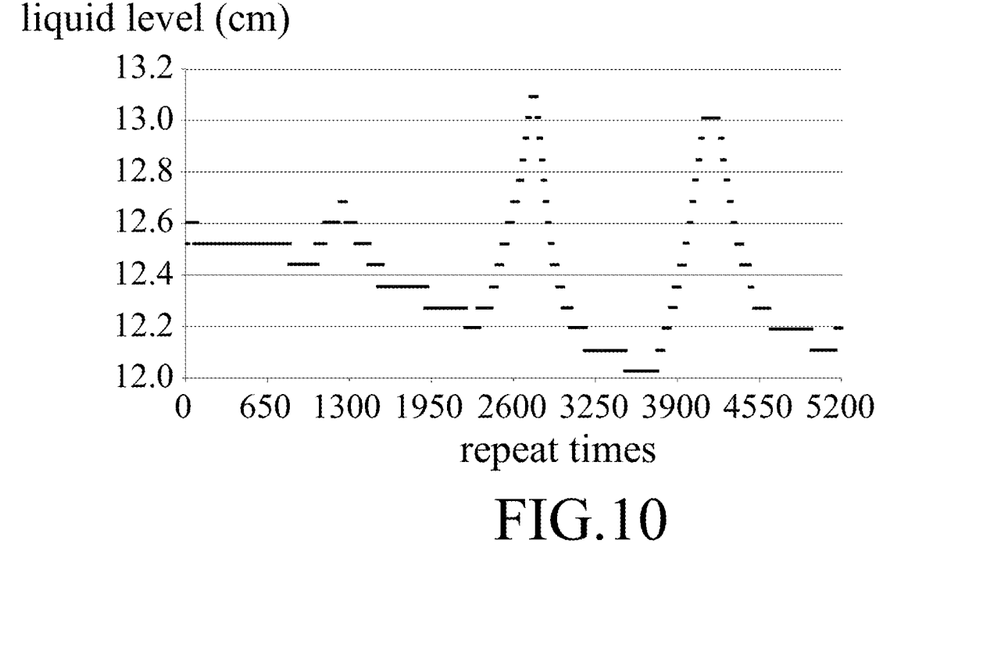
FIG. 10 is a plot illustrating a liquid level calculated by a second modification of the embodiment where a temperature in a tube is not taken into account.
Figure 11:
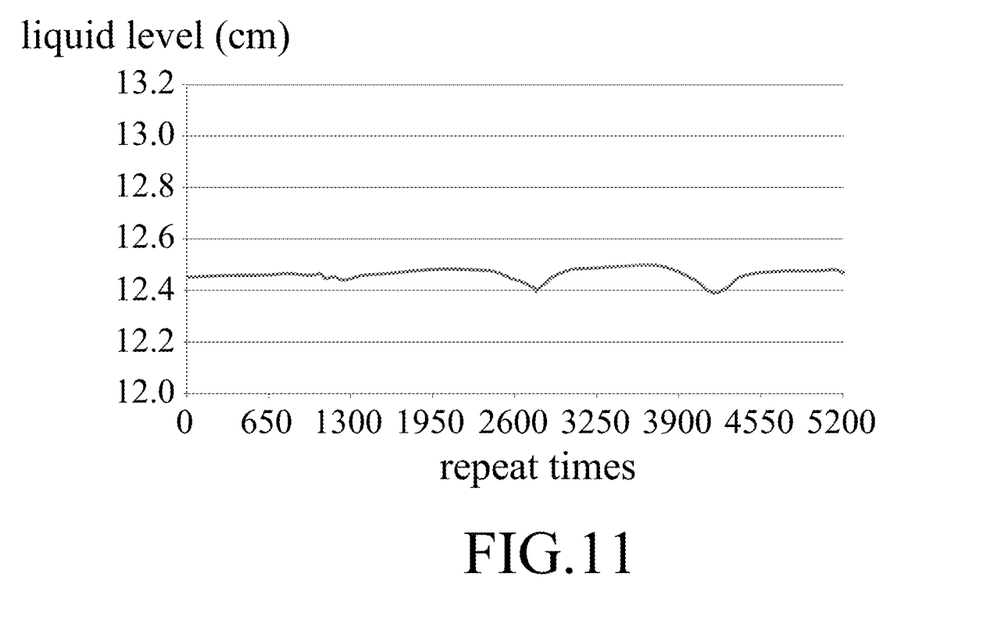
FIG. 11 is a plot illustrating a liquid level calculated by the embodiment.

FIG. 10 illustrates the liquid level calculated many times by a second modification of this embodiment (hereinafter referred to as the second modified embodiment), where the temperature sensor 42 is omitted and the processor 21 obtains the liquid level according to Equation 1 with the speed of sound waves in air being constant, in a scenario where the liquid level is constant and the temperature in the tube 11 changes. FIG. 11 illustrates the liquid level calculated many times by this embodiment in the same scenario. It is known from FIGS. 10 and 11 that a difference between a maximum calculated value and a minimum calculated value of the liquid level in the second modified embodiment is 1.067 cm, and that a difference between a maximum calculated value and a minimum calculated value of the liquid level in the this embodiment is 0.104 cm, evidencing that, by taking the temperature in the tube 11 into account, the liquid level can be more accurately calculated.

Figure 12:
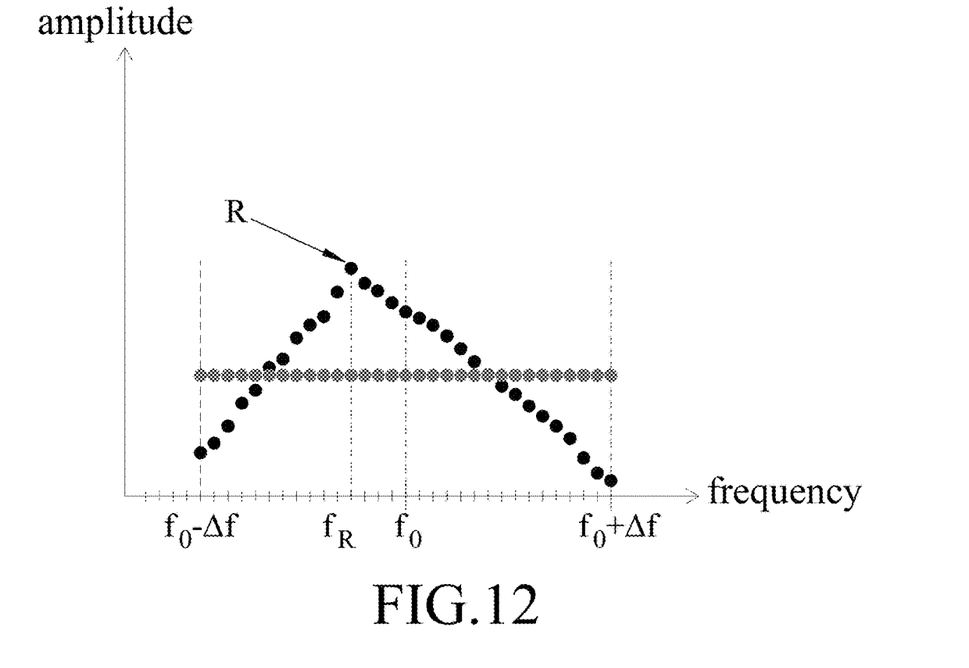
FIG. 12 is a plot illustrating a target frequency range before update and the amplitudes of the corresponding reflected sound waves in the embodiment.
Figure 13:
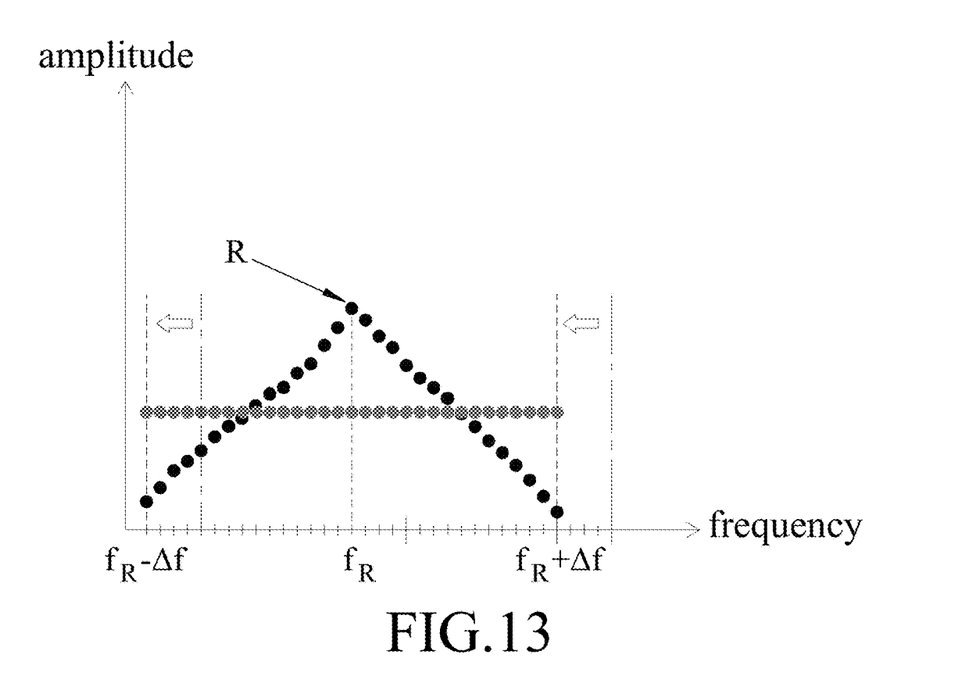
FIG. 13 is a plot illustrating the target frequency range after update and the amplitudes of the corresponding reflected sound waves in the embodiment.

Referring back to FIGS. 3, 5 and 9, in step 104, the processor 21 updates the target frequency range based on the maximum amplitude frequency. In this embodiment, the target frequency range is updated to have a lower limit of (f−Δf) and an upper limit of (f+Δf), where "f" denotes the maximum amplitude frequency, and Δf denotes a predetermined frequency interval. FIG. 12 illustrates the target frequency range before the update, the amplitudes of the corresponding incident sound waves (grey dots), and the amplitudes of the corresponding reflected sound waves (black dots). FIG. 13 illustrates the target frequency range after the update, the amplitudes of the corresponding incident sound waves (grey dots), and the amplitudes of the corresponding reflected sound waves (black dots). The target frequency range previously had a center of $f_0$, and the corresponding maximum amplitude frequency is $f_R$. The target frequency range is updated to have a center that is equal to the maximum amplitude frequency of $f_R$.

Referring back to FIGS. 3, 5 and 9, in step 105, the processor 21 updates the resonant frequency mode number based on the liquid level calculated thereby, so a resolution of the liquid level monitoring system of this embodiment can meet application requirements while the amplitudes of the reflected sound waves can be as large as possible. In addition, when the resonant frequency mode number is changed because of the update, the processor 21 also updates the target frequency range such that the updated target frequency range corresponds to the updated resonant frequency mode number. Then, the flow goes back to step 101.

When the liquid level is between h1 and h2, the resolution is obtained according to the following equation:

$$\Delta h = \frac{h2 - h1}{f2 - f1}, \qquad \text{Equation 3}$$

where Δh denotes the resolution, f1 denotes a first frequency that is derived according to the following equation when the liquid level is h1, and f2 denotes a second frequency that is derived according to the following equation when the liquid level is h2. The following equation is a rearrangement of Equation 2.

$$f = \frac{331 + 0.6 \cdot T}{2 \cdot (L - h + 0.8 \cdot D)} \cdot (n + 1) \qquad \text{Equation 4}$$

It is known from Equations 3 and 4 that the derived frequency changes with the liquid level, and that the resolution changes with the liquid level if the resonant frequency mode number is constant. Therefore, updating the resonant frequency mode number based on the liquid level can reduce the change of the resolution with the liquid level.

In a scenario where the temperature in the tube 11 is 25° C., where the length of the tube 11 is 1.6 m, where the diameter of the tube 11 is 4.1 cm, and where h1 and h2 are respectively 0 cm and 1 cm, various values of the resonant frequency mode number (i.e., n), corresponding values of a frequency difference (denoted as Δf″) which equals (f2−f1), and corresponding values of the resolution (i.e., Δh) are listed in Table 1 below.

It is known from Table 1 that greater resonant frequency mode number leads to smaller Δh (higher resolution). Therefore, when the required Δh is smaller than 1 mm, the resonant frequency mode number should be at least fifteen, and a span of the target frequency range (i.e., 2·Δf) should be at least greater than 10.45 Hz to ensure that the liquid level can be detected when the change of the liquid level between two successive performances of steps 101-105 is not greater than 1 cm.

TABLE 1

| n | Δf″ (Hz) | Δh (cm/Hz) |
|---|---|---|
| 10 | 7.18 | 0.139 |
| 11 | 7.83 | 0.128 |
| 12 | 8.49 | 0.118 |
| 13 | 9.14 | 0.109 |
| 14 | 9.79 | 0.102 |
| 15 | 10.45 | 0.096 |

In a scenario where the temperature in the tube 11 is 25° C., where the diameter of the tube 11 is 4.1 cm, and where h1 and h2 are respectively 0 cm and 1 cm, the minimum value of the resonant frequency mode number (i.e., n) and the corresponding frequency difference (i.e., Δf″) under various value combinations of the length of the tube 11 (i.e., L) and the required resolution are listed in Table 2 below.

TABLE 2

| required resolution | L = 1 m | | L = 1.6 m | | L = 3 m | |
|---|---|---|---|---|---|---|
| (cm/Hz) | n | Δf″ (Hz) | n | Δf″ (Hz) | n | Δf″ (Hz) |
| 0.1 | 6 | 11.46 | 15 | 10.45 | 52 | 10.00 |
| 0.2 | 3 | 6.55 | 7 | 5.22 | 26 | 5.10 |
| 1.0 | 0 | 1.64 | 1 | 1.31 | 5 | 1.13 |

According to Table 2, when the length of the tube 11 is 1.6 m and the required resolution is 0.1 cm/Hz, the minimum value of the resonant frequency mode number is fifteen, and the corresponding frequency difference is 10.45 Hz. Here, the resolution is $$\frac{1 \text{ cm}}{10.45 \text{Hz}} = 0.096 \text{ cm/Hz} \approx 0.1 \text{ cm/Hz}.$$

It is known from Table 2 that, when the length of the tube 11 increases, the resonant frequency mode number should be increased to keep the resolution substantially constant.

In this embodiment, the processor 21 further determines the initial values of the resonant frequency mode number and the target frequency range before the first execution of step 101.

The operations of the liquid level monitoring system of this embodiment in a scenario, where the temperature in the tube 11 is 25° C., where the length of the tube 11 is 1.6 m, where the diameter of the tube 11 is 4.1 cm, and where the required resolution is 0.1 cm/Hz, are described below.

First, the processor 21 receives an estimated value of the liquid level (e.g., 8 cm), and determines the initial value of the resonant frequency mode number (i.e., n) and the frequency interval (i.e., Δf). The estimated value of the liquid level may be obtained by visual inspection by human or other ways. In this embodiment, the processor 21 takes the estimated value of the liquid level as h1, calculates a sum of h1 and a predetermined level interval (e.g., 1 cm) to obtain h2 (i.e., 9 cm), determines that the initial value of the resonant frequency mode number should be at least thirteen (i.e., n≥13) to achieve the required resolution, and determines that the frequency difference (i.e., Δf') is 10.1 Hz when n=13. The processor 21 selects the initial value of the resonant frequency mode number to be equal to a value (e.g., fifteen) that is greater than thirteen, so as to avoid frequent changing of the resonant frequency mode number. The processor 21 selects the frequency interval to be equal to 25 Hz that is greater than 10.1 Hz, so as to ensure that the liquid level can be detected when the change of the liquid level between two successive performances of steps 101-105 is not greater than the predetermined level interval.

Thereafter, the processor 21 calculates a center frequency for the target frequency range to be 1782 Hz according to Equation 4 with n=15, and determines the initial value of the target frequency range to be from (1782−25) Hz to (1782+25) Hz (i.e., from 1757 Hz to 1807 Hz).

Thereafter, the processor 21 performs step 101 to generate, for receipt by the sound generator unit 3, the control signals (S1) that respectively correspond to the target frequencies of 1757 Hz, 1758 Hz, 1759 Hz, . . . , and 1807 Hz, so as to make the sound generator unit 3 generate the incident sound waves that respectively have the target frequencies. The incident sound waves are reflected by the surface 121 of the sound reflector 12 to respectively form the reflected sound waves. The sound sensor 41 senses the reflected sound waves to respectively generate the feedback signals (S2) for receipt by the processor 21. The amplitudes and the frequencies of the incident sound waves generated by the sound generator unit 3, and the amplitudes and the frequencies of the reflected sound waves sensed by the sound sensor 41 can be depicted by a plot similar to FIG. 12, in which the grey dots correspond to the incident sound waves, the black dots correspond to the reflected sound waves, and $f_0-\Delta f$, $f_0$ and $f_0+\Delta f$ are respectively 1757 Hz, 1782 Hz and 1807 Hz.

Thereafter, the processor 21 performs steps 102 and 103 to obtain the maximum amplitude frequency and the liquid level. In an example, the maximum amplitude frequency (e.g., $f_R$ in FIG. 12) is 1778 Hz; and the processor 21 calculates the liquid level to be 7.599 cm according to Equation 2 with f=1778 Hz, and wirelessly transmits the liquid level calculated thereby to the remote control center via the communication module 22. Therefore, the current value of the liquid level can be retrieved from the remote control center.

In this embodiment, the processor 21 calculates the liquid level based on Equation 2 to take the temperature in the tube 11 into account, thereby attaining accurate liquid levels even when the temperature in the tube 11 changes. However, in other embodiments, the processor 21 may calculate the liquid level based on Equation 1 with the speed of sound waves in air being constant.

Thereafter, the processor 21 performs step 104 to update the target frequency range. The center of the target frequency range is updated from 1782 Hz to 1778 Hz. In other words, the target frequency range after the update is from (1778−25) Hz to (1778+25) Hz (i.e., from 1753 Hz to 1803 Hz). As shown in FIG. 13, the target frequency range before the update is the region illustrated by the short-dash-long-dash lines; and since the center frequency changes from 1782 Hz to 1778 Hz, the target frequency range is shifted leftward to the region illustrated by the dashed lines corresponding to $(f_R-\Delta f)$ and $(f_R+\Delta f)$.

Next, the processor 21 performs step 105 to update the resonant frequency mode number in a way similar to the way used to determine the initial value of the same.

Thereafter, the processor 21 performs step 101 again with the target frequency range being from 1753 Hz to 1803 Hz.

It should be noted that, in other embodiments, the processor 21 may pre-store Table 3 below and the predetermined frequency interval (e.g., 25 Hz), may determine the initial value of the resonant frequency mode number (i.e., n) based on the estimated value of the liquid level (i.e., h) and Table 3, and may update the resonant frequency mode number based on the liquid level calculated thereby in step 103 and Table 3.

TABLE 3

| h | n |
|---|---|
| 0 cm ≤ h < 67 cm | 15 |
| 67 cm ≤ h < 105 cm | 5 |
| h ≥ 105 cm | 1 |

In view of the above, the liquid level monitoring system of this embodiment has the following advantages.

1. By virtue of the processor 21 determining the maximum amplitude frequency based on the feedback signals (S2), and calculating the liquid level according to the principle of air column resonance, the liquid level monitoring system can have a low construction cost (about 1.7K New Taiwan Dollars) and a low repair cost, since the components thereof are cheap and need not have high precision.

2. By virtue of the tube 11 that defines the channel 111, and by virtue of the sound reflector 12 that can reflect sound waves with low energy loss, the incident sound waves can transmit in the channel 111 without being interfered by the environment, and can be reflected with low energy loss, and the reflected sound waves can have low distortion after long-distance transmission, thereby attaining high environmental adaptability.

3. By virtue of the temperature sensor 42 that senses the temperature inside the tube 11, and by virtue of the processor 21 that calculates the liquid level based on the temperature sensed by the temperature sensor 42, the error of the liquid level due to changes in the temperature inside the tube 11 can be reduced, thereby attaining high accuracy.

4. By virtue of the processor 21 updating the target frequency range based on the liquid level calculated thereby, the target frequency range can change with the liquid level, so as to keep the liquid level in the detectable range of the liquid level monitoring system.

5. By virtue of the processor 21 repeatedly performing steps 101-105, the liquid level can be successively detected, thereby achieving real time monitoring of the liquid level.

6. By virtue of the processor updating the resonant frequency mode number based on the liquid level calculated thereby, the resolution can meet the application requirements while the amplitudes of the reflected sound waves can be as large as possible, thereby attaining high precision.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. A liquid level monitoring system for detecting a level of a surface of a liquid, said liquid level monitoring system comprising:
   a hardware unit including a tube that is to extend through the surface of the liquid, and that defines a channel;
   a processor unit disposed in said hardware unit, and generating a plurality of control signals that respectively correspond to a plurality of target frequencies in a target frequency range;
   a sound generator unit mounted to said hardware unit, to receive the plurality of control signals from said processor unit, and generating, based on the plurality of control signals, a plurality of incident sound waves that respectively have the plurality of target frequencies, the plurality of incident sound waves transmitting in the channel, and being reflected at a height level of the surface of the liquid to respectively form a plurality of reflected sound waves; and
   a sensor unit mounted to said hardware unit, and to sense the plurality of reflected sound waves to respectively generate a plurality of feedback signals;
   wherein said processor unit is to receive the plurality of feedback signals from said sensor unit, determines, based on the plurality of feedback signals, a maximum amplitude frequency that is a frequency of one of the plurality of reflected sound waves which has a greatest amplitude among all of the plurality of reflected sound waves, and calculates the level of the surface of the liquid based on at least the maximum amplitude frequency and a length of said tube.

2. The liquid level monitoring system of claim 1, wherein:
   said sensor unit includes
      a sound sensor mounted to said tube, and to sense the plurality of reflected sound waves to respectively generate the plurality of feedback signals, and
      a temperature sensor disposed in said tube, and to sense a temperature inside said tube to generate a temperature indication signal;
   said processor unit is to further receive the temperature indication signal from said sensor unit, and calculates the level of the surface of the liquid further based on the temperature indicated by the temperature indication signal.

3. The liquid level monitoring system of claim 1, wherein:
   said processor unit further updates the target frequency range based on the maximum amplitude frequency;
   the target frequency range is updated to have a lower limit of $(f-\Delta f)$ and an upper limit of $(f+\Delta f)$, where "f" denotes the maximum amplitude frequency, and $\Delta f$ denotes a predetermined frequency interval.

4. The liquid level monitoring system of claim 1, wherein said hardware unit further includes a sound reflector that is disposed in said tube, that is configured to float on the surface of the liquid, and that has a surface for reflecting the plurality of incident sound waves to respectively form the plurality of reflected sound waves.

5. The liquid level monitoring system of claim 1, wherein said hardware unit further includes:
   a container accommodating said processor unit, and having said sound generator unit and said sensor unit mounted thereto; and
   a connecting module connecting said container and said tube, and including
      a connector that surrounds said tube, and that is detachably fastened to said container, and
      a ferrule that surrounds said connector, and that pinches said connector to hold said connector and said tube together.

6. The liquid level monitoring system of claim 1, wherein:
   said processor unit calculates the level of the surface of the liquid according to the following equation:

$$h = L + A - \frac{(n+1) \cdot v}{2 \cdot f},$$

where "h" denotes the level of the surface of the liquid, "L" denotes the length of said tube, "A" denotes a constant related to a diameter of said tube, "n" denotes a resonant frequency mode number, "v" denotes a speed of sound waves in air, "f" denotes the maximum amplitude frequency, and a ratio of the constant to the diameter of said tube falls within a range of from 0.7 to 0.9; and
   said processor unit further updates the resonant frequency mode number based on the level of the surface of the liquid.

7. A liquid level monitoring method to be implemented by a processor unit, the liquid level monitoring method being for detecting a level of a surface of a liquid in a tube, the processor unit being operatively associated with a sound generator unit and a sensor unit, the sound generator unit generating a plurality of incident sound waves based on a plurality of control signals provided by the processor unit, the plurality of incident sound waves transmitting in a channel defined by the tube, and being reflected at a height level of the surface of the liquid to respectively form a plurality of reflected sound waves, the sensor unit sensing the plurality of reflected sound waves to respectively generate a plurality of feedback signals for receipt by the processor unit, said liquid level monitoring method comprising:
   (A) generating the plurality of control signals that respectively correspond to a plurality of target frequencies in a target frequency range, so as to make the plurality of incident sound waves respectively have the plurality of target frequencies;
   (B) determining, based on the plurality of feedback signals, a maximum amplitude frequency that is a frequency of one of the plurality of reflected sound waves which has a greatest amplitude among all of the plurality of reflected sound waves; and
   (C) calculating the level of the surface of the liquid based on at least the maximum amplitude frequency and a length of the tube.

8. The liquid level monitoring method of claim 7, further comprising:
   (D) updating the target frequency range based on the maximum amplitude frequency;
   wherein (D) is executed after execution of (C), and (A) is repeated after execution of (D).

9. The liquid level monitoring method of claim 8, wherein, in (D), the target frequency range is updated to have a lower limit of (f−Δf) and an upper limit of (f+Δf), where "f" denotes the maximum amplitude frequency, and Δf denotes a predetermined frequency interval.

10. The liquid level monitoring method of claim 7, wherein, in (C), the level of the surface of the liquid is obtained according to the following equation:

$$h = L + A - \frac{(n+1) \cdot v}{2 \cdot f},$$

where "h" denotes the level of the surface of the liquid, "L" denotes the length of the tube, "A" denotes a constant related to a diameter of the tube, "n" denotes a resonant frequency mode number, "v" denotes a speed of sound waves in air, "f" denotes the maximum amplitude frequency, and a ratio of the constant to the diameter of the tube falls within a range of from 0.7 to 0.9.

11. The liquid level monitoring method of claim 10, further comprising:
   updating the resonant frequency mode number based on the level of the surface of the liquid.

\* \* \* \* \*